Dec. 30, 1930.                    W. O. LUM                    1,787,278
                        ELECTRIC MOTOR CONTROL SYSTEM
                              Filed May 3, 1928
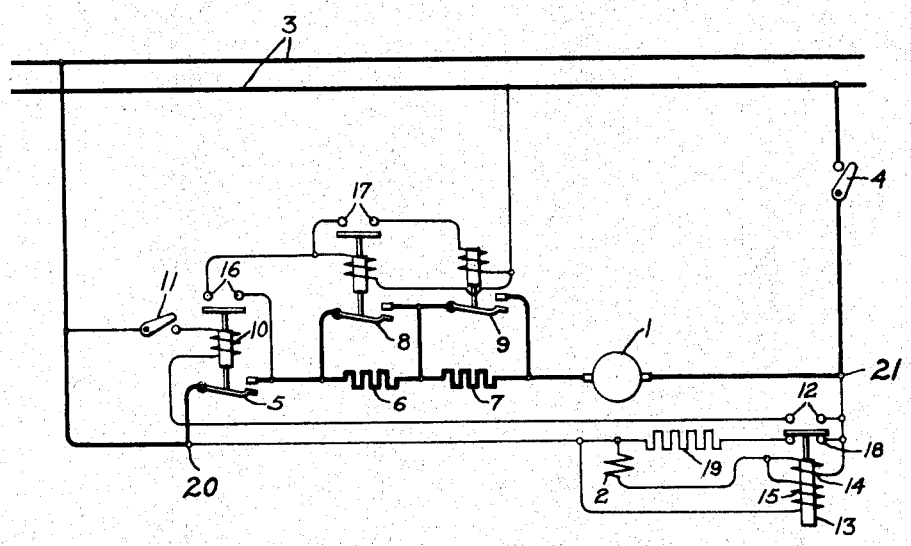
Inventor:
Walter O. Lum,
by Charles E. Miller
His Attorney.

Patented Dec. 30, 1930

1,787,278

UNITED STATES PATENT OFFICE

WALTER O. LUM, OF SCHENECTADY, NEW YORK, ASSIGNOR TO GENERAL ELECTRIC COMPANY, A CORPORATION OF NEW YORK

ELECTRIC-MOTOR-CONTROL SYSTEM

Application filed May 3, 1928. Serial No. 274,908.

My invention relates to the control of electric motors and more particularly to the provision of protective means for the motor whereby the armature circuit of the motor is controlled in accordance with the energization of the shunt field and whereby a discharge path is provided for the shunt field when the main line contactor opens in the event of failure of the source of supply, or in the event of failure of the shunt field circuit independently of the source of supply.

On certain classes of control apparatus, particularly elevator controllers, it is desirable to prevent the motor armature from being energized unless the motor field is properly energized. It is also desirable to disconnect the motor armature from power supply if the motor field becomes open circuited. Also, on elevator motor controllers where the motor shunt field is continuously connected to the power lines it is desirable to provide a discharge resistor around the motor field winding to prevent excessive voltage due to inductance when the main supply switch is opened, upon failure of the supply source. It is not desirable to permanently connect the discharge resistor across the shunt field windings because of the continuous loss of energy in this discharge resistor.

In carrying out my invention in one form I provide protective means responsive to the current in the shunt field winding and the voltage across this field winding, so arranged and connected that it will function to disconnect the motor armature from its supply lines in case of failure of the motor shunt field and also function to connect a discharge path across the shunt field terminals in the event that the connection between the shunt field and the source of supply is opened.

The novel features which I believe to be characteristic of my invention will be definitely indicated in the claims appended hereto, the form of connections, the mode of operation and further objects of my invention will be readily understood from a consideration of the following description taken in connection with the accompanying drawing the single figure of which shows diagrammatically the form of connections which I prefer to employ.

Referring to the drawing, I have shown my invention in one form as applied to a direct current electric motor provided with an armature 1 and a shunt field 2, the motor being supplied with energy from a suitable source of direct current supply 3 through a suitable disconnecting switch 4 which may be normally closed. The armature 1 is arranged to be connected to the source of supply 3 through switch 5 and the usual starting resistors 6 and 7 having respectively the customary short-circuiting switches 8 and 9. The switch 5 which is designed to have a relatively low release value is closed by an electromagnet 10 energized through the pilot switch 11 and the contacts 12 of the relay 13 which comprises coil 14 in series with the shunt field 2 and coil 15 in multiple with the shunt field 2. This relay is designed to have a relatively high release value and its coils 14 and 15 are so designed and wound upon the core 13 that both must be substantially equally energized and in the same direction in order to cause the relay to operate to its upper or closed position in which it engages the contacts 12. Thus, in the event of failure of current in the shunt field winding 2 the energizing coil 14 of the relay will likewise become currentless and the relay will be deenergized and permitted to drop to its lower position to bridge the contacts 18. Similarly the failure of current in coil 15 or the reversal of the direction of the current in either coil 14 or 15 will result in deenergization of the relay and thus effect its operation to the lower or open position. When the switch 5 is closed the auxiliary contacts 16 are short-circuited and the operating coil of switch 8 is thereby energized to close switch 8 which short circuits the starting resistor 6. When the switch 8 is closed the auxiliary contacts 17 are short circuited and the operating coil of switch 9 is thereby energized to close switch 9 which short circuits the starting resistor 7. It will be understood that suitable means will be provided for introducing a time interval between the closing of the switches to permit acceleration of the motor, such as means responsive to the current in the motor circuit. When the coils 14 and 15 of the relay 13 are energized, its armature is raised to short circuit the contacts 12 and when either one of the coils 14 and 15 is deenergized the armature of the relay 13 drops to short circuit the contacts 18 thereby connecting the discharge resistor 19 across the shunt field 2.

The operation of my invention is as follows: When the disconnecting switch 4 is closed the coils 14 and 15 are energized to normal value and cause relay 13 to close the contacts 12. With the contacts 12 closed, the closing of switch 11 will energize electromagnet 10 and switch 5 will close to connect the motor to the source of supply for starting. Resistors 6 and 7 are cut out in the usual manner by switches 8 and 9 and the motor is thus brought up to speed. If now for any reason there should be a failure of field current in the shunt field winding 2 such for example as might be occasoned by the connections between the terminals of the shunt field winding 2 and the field supply terminals 20 and 21 becoming loosened or interrupted, the series connected coil 14 will become currentless thus tending to deenergize the relay whilst the direction of current flow in the shunt connected coil 15 will become suddenly reversed due to the inductive discharge of the shunt field winding, thereby hastening the deenergization of the relay and effecting its immediate operation to the lower or open position. In operating to its open position the relay 13 opens contacts 12 and closes contacts 18 to connect the discharge resistor 19 across the shunt field terminals. The opening of the contacts 12 effects a deenergization of the operating winding 10 of the line contactor 5 thereby permitting the latter to drop to its lower position and to disconnect the armature 1 of the motor from the source of supply 3.

Should the circuit interruption occur in the field winding itself the current in the series coil 41 will be reduced to such a low value, due to the high resistance of the coil 15, that the relay 13 will be operated to its lower postion to deenergize and open the line contactor 5.

From this form of connection and mode of operation it will be seen that my invention provides a motor field protective relay so arranged and connected that it will function to disconnect the motor armature from its source of supply in case of failure of current in the motor shunt field circuit, and also function to connect a discharge path across the shunt field terminals in the event that the connection between the shunt field and the source of supply is interrupted.

It will further be noted that when the shunt field circuit is interrupted, the inductive discharge of the field 2 reverses the potential (or excitation) of coil 15 causing relay 13 to drop very quickly to open contacts 12 and close contacts 18. The switch 4 is normally closed so that the field winding 2 is normally energized irrespectively of whether the line contactor 5 is open or closed. Should the switch 4 be opened at a time when the line contactor 5 is open the shunt field winding 2 will initially tend to discharge its stored energy across the open contacts of switch 4. This inductive discharge of the field winding, however, will reverse the direction of current in the coil 15 which will immediately operate the relay 13 to its lower position to connect the discharge resistance 19 across the terminals of the shunt field winding 2. As a result the greater portion of the energy stored inductively in the shunt field winding is dissipated in the discharge resistor 19 and consequently the destructive arcing that would otherwise ensue at the contacts of the switch 4 will be very materially reduced.

When the power lines to the motor armature are interrupted, as for example by opening switch 4, relay 13 will drop out when the C. E. M. F. of the motor armature has decreased to the "release" voltage of relay 13. Relay 13 in releasing will open the contacts 12 to deenergize line switch 5 and close contacts 18 to connect the discharge resistor 19 across the shunt terminals of the shunt field 2.

In accordance with the provisions of the patent statutes, I have described the principle of operation of my invention together with the apparatus which I now consider to represent the best embodiment thereof, but I would have it understood however, that the apparatus shown is only illustrative and that the invention may be carried out by other means.

What I claim as new and desire to secure by Letters Patent of the United States, is:—

1. The combination with a motor provided with a shunt field winding, of means responsive to the current in said winding and additional means responsive to the voltage existing across said field for controlling the energization of said motor.

2. The combination with a shunt motor of an electro-magnetic switch in the armature circuit and means controlled by the field current and additional means controlled by the voltage existing across the shunt field winding for controlling the closing and opening of said switch.

3. The combination with a shunt motor, of a normally open electro-magnetic switch in the armature circuit, and automatic electroresponsive means for normally holding said switch closed but permitting said switch to open when either the current through the shunt field winding or the voltage across said winding falls below a predetermined value.

4. In motor controlling apparatus, the combination with a shunt motor, of a switch in the armature circuit and means for normally holding said switch closed and responsive to a decrease in the energization in the shunt field circuit to permit said switch to open, said means comprising a two coil relay, one coil of said relay being in series relation with the field circuit and the other coil of said relay being in multiple relation with the field circuit.

5. In motor controlling apparatus, the combination of a motor armature and a shunt field winding energized from a source of supply, a control circuit, a switch in said control circuit and means responsive to the current in said field winding and additional means responsive to the voltage existing across said field winding for operating said switch when the said current and voltage decrease below their normal values.

6. In combination, a motor having a shunt field winding arranged to be connected to a source of supply, means responsive to the energization of said shunt field winding for controlling the connection of the motor to said source, said means comprising a switch in the armature circuit, an electro-magnet energized through a control circuit for holding said switch closed, a relay for interrupting said control circuit to permit said switch to open, said relay having two windings, one of said windings being connected in series with the shunt field winding and the other of said windings being connected in multiple with said field winding.

7. The combination with a shunt motor, of a switch for controlling the continuity of the armature circuit, an electro-magnet for holding said switch closed, an additional switch for controlling said electro-magnet and a two coil electro-magnet having one coil in series relation and the other coil in multiple relation with the shunt field circuit and normally holding said additional switch closed but permitting the same to open to effect the opening of said first-named switch and the consequent opening of the armature circuit when the current in either coil of the two coil magnet decreases below normal value.

8. The combination with a shunt motor, of a switch in the armature circuit, means for controlling said switch, said means comprising a field protective relay having a voltage coil and a current coil, said coils being energized by the field voltage and the field current respectively, said relay operating to effect the opening of the armature circuit and the closing of a discharge path across the shunt field terminals when said voltage and current decreased below their normal values.

In witness whereof, I have hereunto set my hand this 2nd day of May, 1928.

WALTER O. LUM.